Patented July 21, 1942

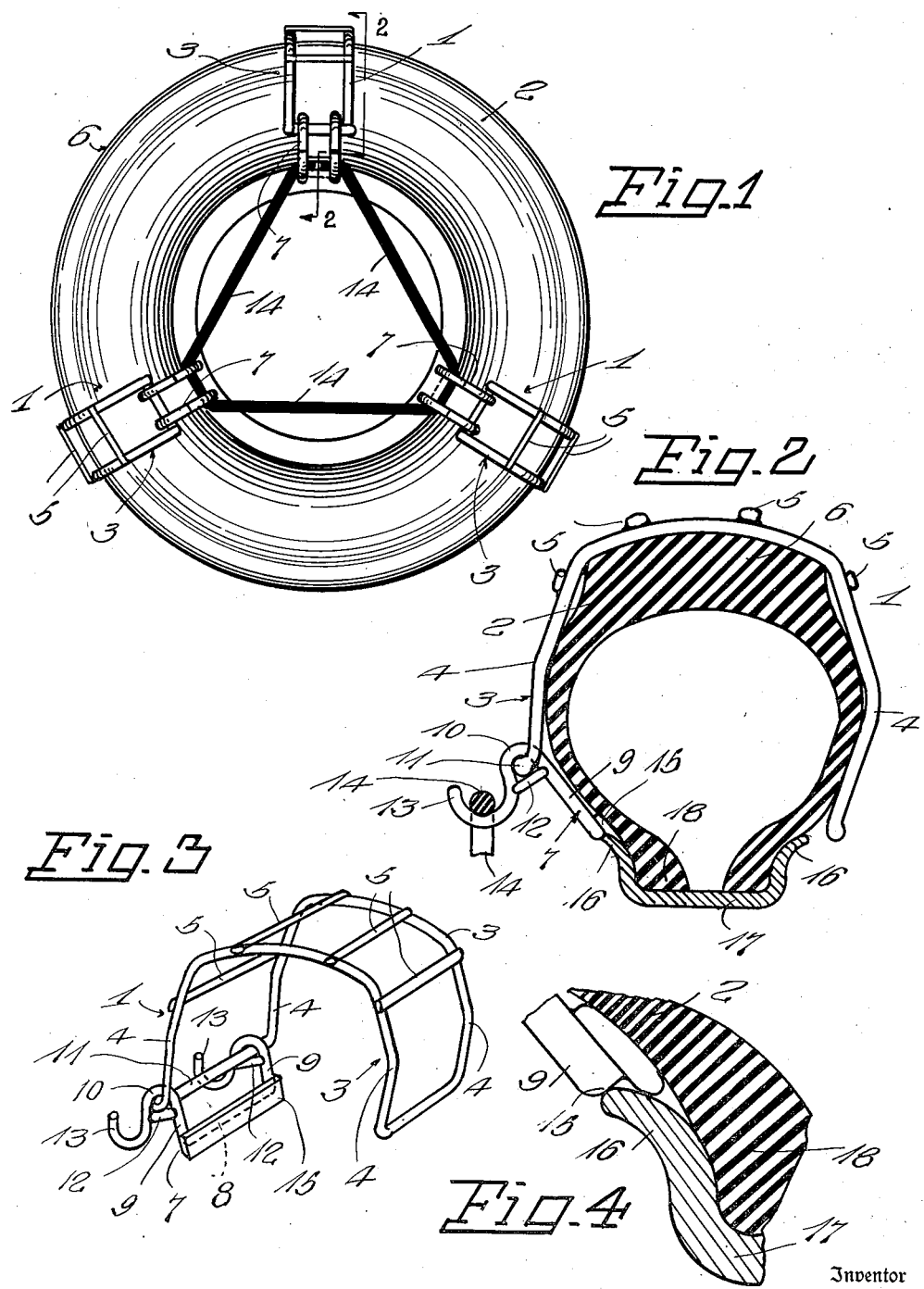

2,290,398

UNITED STATES PATENT OFFICE 2,290,398

ANTISKID DEVICE

Clifford J. Wellington, Mead, Wash.

Application January 6, 1941, Serial No. 373,357

3 Claims. (Cl. 152—226)

This invention relates to an anti-skid device for automobiles and more particularly to a device of this character which is adapted to be applied to the tire of a wheel and prevent the wheel from turning in a mud hole or on snow or ice.

When the wheel of an automobile is resting on snow or ice, or in a mud hole, it will turn without propelling the automobile and it is difficult to move the automobile across the slippery place or out of the mud hole.

Therefore, one object of the invention is to provide an anti-skid means consisting of a plurality of shoes which are applied to a tire and serve very effectively to enable the wheel to have gripping engagement with the surface upon which it rests and move forwardly or rearwardly, instead of merely turning while the wheel at the opposite side of the automobile remains stationary.

Another object of the invention is to provide a set of anti-skid devices which may be very easily applied to the tire and held thereon while they are in use.

Another object of the invention is to so form the anti-skid shoes that when they are applied to a tire they will be prevented from having creeping movement about the tire out of their proper spaced relation to each other.

Another object of the invention is to so form the anti-skid shoes that they may be applied from the outside of a wheel without it being necessary to reach back of the wheel.

Another object of the invention is to so form the securing means that when the improved anti-skid device is applied, a portion of the securing member will have wedging fit between the tire and the wheel rim and very effectively hold the anti-skid device in place.

Another object of the invention is to provide an anti-skid device which is formed of metal strands and will be of light weight but very strong.

The invention is illustrated in the accompanying drawing, wherein:

Fig. 1 is a side elevation showing a set of anti-skid devices applied to the tire of an automobile wheel.

Fig. 2 is a transverse sectional view taken on the line 2—2 of Fig. 1.

Fig. 3 is a perspective view of one of the anti-skid devices.

Fig. 4 is an enlarged fragmentary sectional view illustrating the manner in which the fastener of the anti-skid device has wedging fit between the wheel rim and the tire.

The improved anti-skid devices or shoes 1 are spaced from each other circumferentially of the tire 2, when applied thereto. While three shoes have been shown in use in Fig. 1 of the drawings, it will be obvious that any number desired may be applied to a tire which can be conveniently accommodated by the tire.

The shoes are of duplicate construction and each is formed as shown in Fig. 3. Referring to this figure, it will be seen that the shoe is formed of metal strands made from spring steel or other resilient material. The shoe has a frame 3 which is substantially U-shaped so that it may straddle the tire, as shown in Fig. 2. The arms or jaws of the frame are bent, as shown at 4, so that these arms will have snug fitting engagement with side walls of the tire, and side bars of the frame carry bridging strips or bars 5 which extend longitudinally of the tread portion 6 of the tire when the shoe is applied thereto. While the cross bars 5 have been shown extending at right angles to the side bars of the frame, it will be understood that the angle between the side bars and cross bars may be varied and also that they may be curved or otherwise shaped if so desired. The cross bars serve to prevent side skidding as well as assisting to prevent the wheel from spinning.

In order to secure the shoe on the tire there has been provided a securing member or fastener 7 formed from a metal strand bent to form a bridge portion 8 and arms 9. The arms are folded back upon themselves to form hinge portions or sockets 10 which engage about the outer end bar 11 of the frame 3 and are loosely held in engagement thereby by retainer bars 12. Extremities of the arm 9 are bent to form hooks 13 for engagement by an elastic band 14 which is engaged with the hooks of all of the securing members, as shown in Fig. 1, and exerts pull radially of the wheel toward the center thereof. A strip or blade 15 is welded or otherwise fixedly secured along the bridge 8 of the keeper or securing member 7 and projects therefrom, as shown in Figs. 2 and 4, so that when the shoe or anti-skid device is applied to the tire this strip or lip may engage between the flange 16 of the rim 17 and the bead 18 of the tire 2. Therefore, the lip or strip will be firmly gripped between the tire and the wheel rim and likelihood of the keeper slipping out of gripping engagement with the tire eliminated.

When the driver of an automobile finds that the wheels, or one driving wheel spins, due to resting in a mud puddle or upon icy or snow-covered ground, the shoes are applied and grip will then be established with the ground to cause the wheel to propel the vehicle forwardly or rearwardly, according to the direction in which the wheel is turning. The shoes or anti-skid devices of each set are spaced from each other circumferentially of the wheel to which they are applied and the keepers then moved to the gripping position of Fig. 2, in which position their lips 15 engage between the rim of the wheel and the bead of the tire. Since the keepers are carried by the outer arm or jaw of the frame 3, the shoes may be easily applied from a position outwardly of the wheel, the keepers being then easily movable to a securing position, and the elastic band also being readily applied to the hooks of the keepers. The elastic band will then exert inward pull radially of the wheel and the keeper will be held in position to grip the outer wall of the tire and prevent the shoes from shifting radially of the tire out of operative engagement therewith. When the automobile has passed over the slippery surface or the wheel moved out of the mud puddle, it is merely necessary to remove the elastic band and the keepers can then be swung to releasing position and the shoes removed and put away until again needed.

Having thus described the invention, what is claimed as new is:

1. An anti-skid attachment of the character described comprising a plurality of shoes adapted to be disposed in straddling engagement with a tire in spaced relation to each other circumferentially thereof, each shoe having a U-shaped body for straddling a tire with its arms in engagement with inner and outer side walls of the tire, a keeper having side arms pivoted to the free end of outer arm of the body and having end portions bent to form outwardly extending hooks, and an elastic band for engaging the hooks of the keepers and exerting pull thereon to urge the keepers into gripping engagement with the tire.

2. An anti-skid shoe for a tire comprising a U-shaped body for straddling a tire, the body being formed from a strand of metal and having side bars and end bars, cross bars extending between and anchored to the side bars in spaced relation to each other longitudinally thereof, and a keeper having a cross bar and side arms pivotally engaged with the end bar at the outer end of the body and mounting the keeper for movement into and out of position to engage the outer side wall of the tire and hold the shoe in place thereon, and a plate mounted along the cross bar of the keeper and having a portion extending therefrom for wedging engagement between the bead of a tire and the side flange of a wheel rim.

3. An anti-skid shoe for a tire comprising a U-shaped body for straddling a tire, the body being formed from resilient material and having a bridge portion consisting of inner and outer arms formed with bars at their outer ends, and a keeper carried by the end bar of the outer arms and having a bridge and side arms, the side arms of the keeper being bent to form hinge portions engaged about the end bar of the outer arms of the body to mount the keeper for swinging movement into and out of operative position, a plate carried by the bridge of the keeper with a portion projecting therefrom to provide a lip for engaging between the bead of a tire and a side flange of a wheel rim.

CLIFFORD J. WELLINGTON.